United States Patent
Nagalla et al.

(10) Patent No.: US 12,218,900 B2
(45) Date of Patent: Feb. 4, 2025

(54) SYSTEMS AND METHODS OF ELECTRONIC NOTIFICATIONS

(71) Applicant: OneSky Flight LLC, Richmond Heights, OH (US)

(72) Inventors: Durga Nagalla, Richmond Heights, OH (US); Christopher Taggart, Richmond Heights, OH (US); William Lanphear, Richmond Heights, OH (US)

(73) Assignee: OneSky Flight LLC, Richmond Heights, OH (US)

( * ) Notice: Subject to any disclaimer, the term of this patent is extended or adjusted under 35 U.S.C. 154(b) by 0 days.

(21) Appl. No.: 18/099,821

(22) Filed: Jan. 20, 2023

(65) Prior Publication Data
US 2023/0239265 A1    Jul. 27, 2023

Related U.S. Application Data

(60) Provisional application No. 63/302,406, filed on Jan. 24, 2022.

(51) Int. Cl.
*G06F 15/16* (2006.01)
*G08G 5/00* (2006.01)
*H04L 51/224* (2022.01)

(52) U.S. Cl.
CPC ........ *H04L 51/224* (2022.05); *G08G 5/0039* (2013.01)

(58) Field of Classification Search
CPC ..... H04L 51/224; H04L 51/226; H04L 51/21; H04L 51/00; G08G 5/0039
(Continued)

(56) References Cited

U.S. PATENT DOCUMENTS

2004/0054550 A1 * 3/2004 Cole ................. G06Q 10/0639
705/13
2004/0254998 A1 * 12/2004 Horvitz .................. H04L 51/04
709/206

(Continued)

OTHER PUBLICATIONS

Flightradar. "Flight Tracking from the Comfort of Your Own Home—Is That Possible?" Real-Time Flight Tracker Map—Flightradar.Live, flightradar.live, Dec. 1, 2021, web.archive.org/web/20211220095452/https://flightradar.live/en/flight-tracker/. (Year: 2021).*

(Continued)

*Primary Examiner* — Kaylee J Huang
(74) *Attorney, Agent, or Firm* — Foley & Lardner LLP

(57) ABSTRACT

Systems and methods of operating smart notifications are disclosed. In one aspect, a method includes receiving, at a first time, a first request to transmit a first electronic message to a pilot account associated with an electronic device, and queuing the first electronic message without notification to the electronic device. The method also includes receiving, at a second time, a second request to transmit a second electronic message to the electronic device, and queuing the second electronic message without notification to the electronic device. The method further includes in response to identifying an end of the restricted period, transmitting, at a third time after the end of the restricted period, a third electronic message to the pilot account associated with electronic device, the third electronic message comprising an updated flight event in accordance with a first flight event and a second flight event.

20 Claims, 3 Drawing Sheets

(58) Field of Classification Search
USPC .................................. 709/206, 204, 203, 207
See application file for complete search history.

(56) References Cited

U.S. PATENT DOCUMENTS

| | | | | |
|---|---|---|---|---|
| 2007/0150544 | A1* | 6/2007 | Jachner | H04L 65/1094 709/207 |
| 2009/0118998 | A1* | 5/2009 | Chau | G08G 5/0082 705/14.27 |
| 2009/0248458 | A1* | 10/2009 | Ouellette | G06Q 30/06 705/40 |
| 2011/0107084 | A1* | 5/2011 | Hubner | H04W 12/033 713/153 |
| 2011/0225257 | A1* | 9/2011 | Tilden | G06F 16/9535 709/207 |
| 2012/0278475 | A1* | 11/2012 | Papakipos | G06Q 50/01 709/224 |
| 2016/0311650 | A1* | 10/2016 | Hautakorpi | H04L 51/226 |
| 2017/0289087 | A1* | 10/2017 | Chang | H04L 51/224 |
| 2019/0334614 | A1* | 10/2019 | Mohideen | H04B 7/18517 |
| 2021/0136014 | A1* | 5/2021 | Hart | H04L 51/56 |

OTHER PUBLICATIONS

Extended European Search Report on EPO App. 23152839.9 dated Jun. 7, 2023 (9 pages).

* cited by examiner

```
┌─────────────────────────────────────────────────────────────────────┐
│ Receiving, at a first time, a first request to transmit a first    │
│ electronic message to a pilot account associated with an           │
│ electronic device, the first electronic message associated with    │
│ a first flight event. 202                                          │
└─────────────────────────────────────────────────────────────────────┘
                                 ↓
┌─────────────────────────────────────────────────────────────────────┐
│ In response to identifying that the first time is within a         │
│ restricted period configured for the pilot account, queuing the    │
│ first electronic message without notification to the electronic    │
│ device. 204                                                         │
└─────────────────────────────────────────────────────────────────────┘
                                 ↓
┌─────────────────────────────────────────────────────────────────────┐
│ Receiving at a second time, a second request to transmit a         │
│ second electronic message to the electronic device, the second     │
│ electronic message associated with a second flight event. 206      │
└─────────────────────────────────────────────────────────────────────┘
                                 ↓
┌─────────────────────────────────────────────────────────────────────┐
│ In response to identifying that the second time is within the      │
│ restricted period, queuing the second electronic message without   │
│ notification to the electronic device. 208                         │
└─────────────────────────────────────────────────────────────────────┘
                                 ↓
┌─────────────────────────────────────────────────────────────────────┐
│ In response to identifying an end of the restricted period,        │
│ transmitting, at a third time after the end of the restricted      │
│ period, a third electronic message to the pilot account            │
│ associated with electronic device, the third electronic message    │
│ comprising an updated flight event in accordance with the first    │
│ flight event and the second flight event. 210                      │
└─────────────────────────────────────────────────────────────────────┘
```

FIG. 2

SYSTEMS AND METHODS OF ELECTRONIC NOTIFICATIONS

CROSS-REFERENCE TO RELATED APPLICATIONS

This application claims priority to U.S. Provisional Patent Application No. 63/302,406, filed Jan. 24, 2022, which is incorporated herein in its entirety for all purposes.

TECHNICAL FIELD

This application relates generally to the field of electronic notifications.

BACKGROUND

Pilots are limited in the amount of time they are allowed to fly in any given time period for the safety of the pilots, the crew, and everyone on board. Different countries and/or regions may impose different limits on how long the pilots are supposed to rest between flights. Furthermore, there may be limitations on whether the pilots are allowed to receive any messages from their employers (e.g., airlines) so that the pilots may rest longer and better without worrying/stressing about the next flight. The employer may want to send a notification to a pilot during this rest period, but the certain restrictions and penalties may apply.

Conventional notification systems typically send the notification in accordance with the sender's requested criteria (e.g., wherever and whenever the sender desires). Therefore, to avoid inappropriately notifying pilot, employees of airlines manually determine whether it is appropriate to contact a pilot. If appropriate, the administrator contacts the pilot. If not appropriate, the administrator must withhold the notification and send the notification at a later time. This method is highly undesirable because it depends on the administrator's subjective skills and understanding. Moreover, keeping track of multiple notifications and flight events affecting various flights and pilots is an arduous task that inevitably leads to human error. As flights are delayed and rescheduled, the monitoring of pilots' hours becomes even more complicated.

In order to improve the conventional methods, some conventional solutions may utilize applications locally installed on pilot devices that prevent the device from outputting notifications. However, these applications have faced many technical challenges. For instance, these conventional applications hold all the notifications in a queue and release the notifications from the queue in their entirety when it is appropriate to contact the pilot. First, a pilot may have multiple electronic devices (e.g., smart phone, tablet, laptop, etc.), so the pilot must install the application on all of the devices, some of which may be personal, which may be undesirable. Second, the pilot may be overwhelmed by receiving multiple notifications at once and may need to review the notifications themselves in order to determine the latest flight event. Some of these notifications may even be outdated by the time the pilot receives the notification.

SUMMARY

According to various embodiments of the present disclosure, systems and methods of operating electronic notifications are disclosed. Rather than the passenger and/or airline sending all of the messages directly to the pilot, a processor (e.g., an analytics server) can receive all of the messages, process the messages, and then consolidate the messages into a unified message that only conveys what the pilot needs to know after the restricted period. The analytics server may also receive data from other sources such as weather stations, news stations, and any other source that may provide useful data for the pilot to know for the pilot's next flight. The updated message may be transmitted to the pilot's electronic device after the restricted period is over, and the pilot may receive the information the pilot needs to know.

In an embodiment, the method includes receiving, by a processor at a first time, a first request to transmit a first electronic message to a pilot account associated with an electronic device, the first electronic message associated with a first flight event; in response to identifying that the first time is within a restricted period configured for the pilot account, queuing the first electronic message without notification to the electronic device; receiving, by the processor, at a second time, a second request to transmit a second electronic message to the electronic device, the second electronic message associated with a second flight event; in response to identifying that the second time is within the restricted period, queuing the second electronic message without notification to the electronic device; and in response to identifying an end of the restricted period, transmitting, by the processor at a third time after the end of the restricted period, a third electronic message to the pilot account associated with electronic device, the third electronic message comprising an updated flight event in accordance with the first flight event and the second flight event.

In another embodiment, a computer system includes a processor and a non-transitory computer-readable medium containing instructions that when executed by the processor causes the processor to perform operations comprising: receiving, at a first time, a first request to transmit a first electronic message to a pilot account associated with an electronic device, the first electronic message associated with a first flight event; in response to identifying that the first time is within a restricted period configured for the pilot account, queuing the first electronic message without notification to the electronic device; receiving, at a second time, a second request to transmit a second electronic message to the electronic device, the second electronic message associated with a second flight event; in response to identifying that the second time is within the restricted period, queuing the second electronic message without notification to the electronic device; and in response to identifying an end of the restricted period, transmitting, at a third time after the end of the restricted period, a third electronic message to the pilot account associated with electronic device, the third electronic message comprising an updated flight event in accordance with the first flight event and the second flight event.

In still another embodiment, a computer system includes an electronic device configured to present one or more pages, and a server in communication with the electronic device, the server configured to: receiving, at a first time, a first request to transmit a first electronic message to a pilot account associated with an electronic device, the first electronic message associated with a first flight event; in response to identifying that the first time is within a restricted period configured for the pilot account, queuing the first electronic message without notification to the electronic device; receiving, at a second time, a second request to transmit a second electronic message to the electronic device, the second electronic message associated with a second flight event; in response to identifying that the second time is within the restricted period, queuing the second electronic message without notification to the electronic device; and in response to identifying an end of the restricted period, transmitting, at a third time after the end of the restricted period, a third electronic message to the pilot account associated with electronic device, the third electronic message comprising an updated flight event in accordance with the first flight event and the second flight event.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

FIG. 2 illustrates a flowchart of a method depicting operational steps for creating and modifying smart notifications, in accordance with some embodiments.

DETAILED DESCRIPTION

Figure 1:
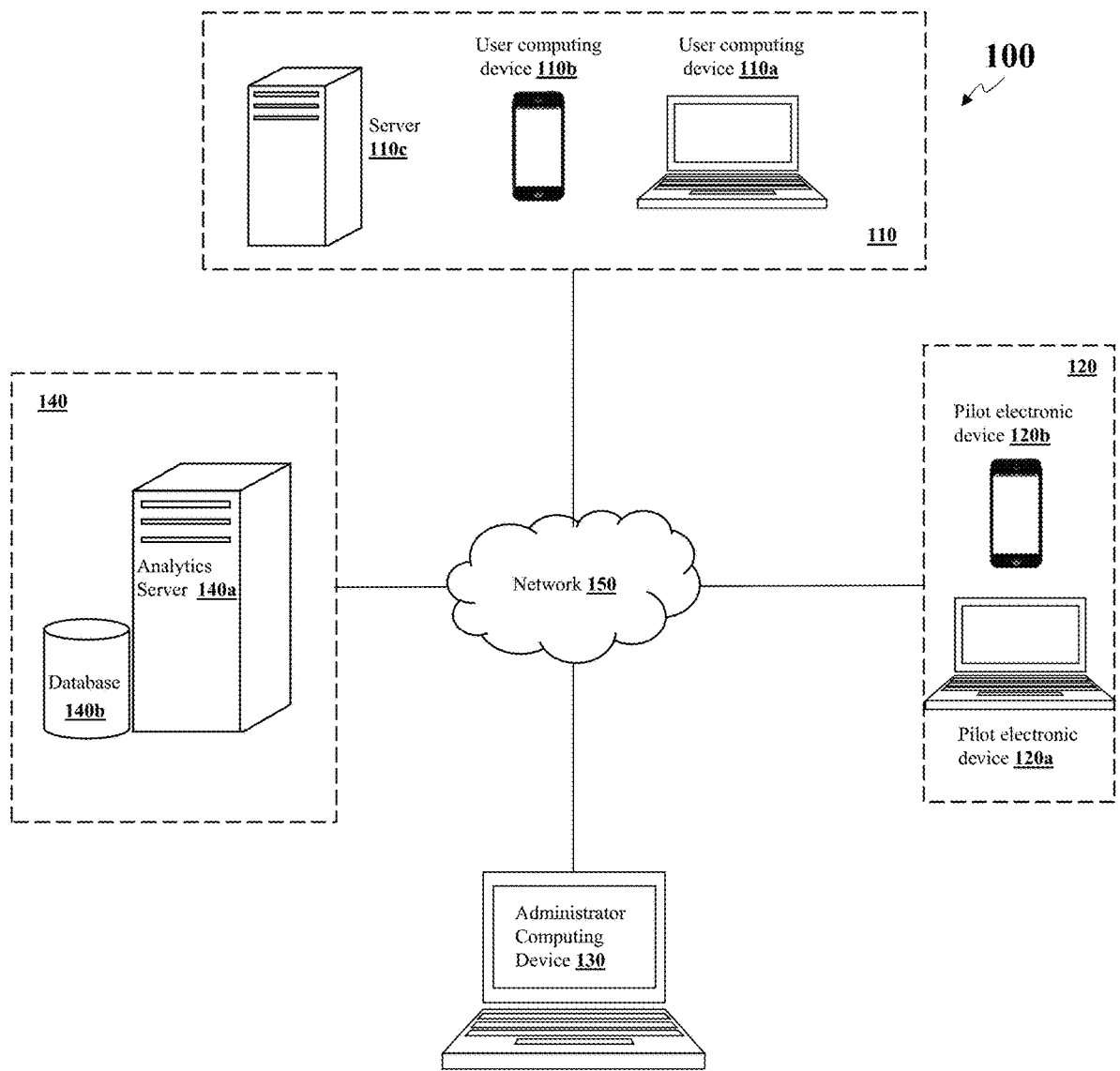
FIG. 1 illustrates various components of a system for generating, modifying and transmitting smart notifications, in accordance with some embodiments.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Pilots are subject to restricted periods during which the pilot's employer (e.g., airline) is not permitted to directly contact the pilot. This restricted period typically begins at the end of a flight and lasts a variable amount of time, depending on local, state, federal, and international rules. For example, a pilot may be limited to eight hours of flight time in a day depending upon the number of pilots on the flight, or a pilot may be limited to 60 hours of flight duty per week. These restrictions are in place to provide for safety purposes so that the pilots are well-rested for the next flight.

After a restricted period ends, a pilot may receive all of the updates that may affect the pilot's flight all at the same time. The pilot's computing device may receive a large number of notifications, including outdated and irrelevant messages, thereby obfuscating the noteworthy messages. The challenges in communication also cause inefficiencies in preparation of the aircraft for a flight. For example, a passenger who is scheduled to fly with the pilot may wish to update the pilot on various accommodations, such as a request to include additional passengers, additional cargo, etc. The passenger may submit a message indicating five additional passengers to be added to a flight list, which may affect weight distribution and capacity. The passenger may submit another message indicating that only two additional passengers are to be added, which may again change how the pilot distributes the weight of the passengers and other supplies on the plane. The passenger may then submit another message to bring additional cargo (e.g., several more suitcases) and then later submit another message indicating there is even more cargo for the flight. The passenger may also request to leave three hours earlier than initially planned and then later to leave only two hours earlier than originally planned. Once the pilot comes out of the restricted period, the pilot's electronic device would conventionally receive all of the messages from the passenger and/or airline that the pilot, including those messages that are no longer relevant. The pilot wants information about the actual flight departure time, how many additional passengers, any additional weight, as well as the latest weather forecast, etc. Accordingly, there is a desire to provide systems and methods of providing notifications to the pilot that only include the updated information that the pilot needs to know for the flight. The system described herein may execute the methods to regulate how and when the pilot is notified with pertinent flight events (e.g., messages received from the passenger(s) that affect the flight). For instance, instead of directly transmitting a notification that corresponds to each message received from the passenger, a server (e.g., analytics server) may determine whether the pilot is in their restricted period and transmit a notification to the pilot's device that includes the latest and updated information needed by the pilot after the restricted period has ended.

As another example, the electronic device may get several notifications at once, once the restricted period ends, and the notifications may all be related to the departure time changes for the pilot's next flight. The electronic device has to sort the received notifications by the timestamps of the notifications so that the notifications are displayed chronologically. However, even after that the sort, it may still be desirable to display only the latest notification that includes the latest departure time. As a result, the electronic device may waste processing resources and utilize the display for unwanted messages. Accordingly, there is a need for the use of a system where the analytics server identifies the pertinent messages and sends only relevant notifications at an appropriate time to the pilot's device.

According to various embodiments of the present disclosure, systems and methods of operating smart notifications are disclosed. Rather than the passenger and/or airline sending all of the messages directly to the pilot, an analytics server can receive all of the messages, process the messages, and then consolidate the messages into a unified message that only conveys what the pilot needs to know. The analytics server may also receive data from other sources such as weather stations, news stations, and any other source that may provide useful data for the pilot to know for the pilot's next flight. The updated message may be transmitted to the pilot's electronic device after the restricted period is over, and the pilot may receive the information the pilot needs to know.

Referring to FIG. 1, illustrates various components of a system 100 for generating and transmitting smart notifications, in accordance with some embodiments. The system 100 provides a non-limiting example of a computer system having various features that can be utilized to generate and modify smart notifications that are transmitted to a pilot.

The system 100 may include user computing devices 110a and 110b and server 110c (collectively user computing devices 110), pilot electronic devices 120a and 120b (collectively pilot electronic devices 120), an administrator computing device 130, an analytics server 140a, database 140b, and a network 150. The network 150 may include, but is not limited to, private or public local area network, wireless local area network, metropolitan area network, wide-area network, and the Internet. The network 150 may further include both wired and wireless communications according to one or more standards via one or more transport mediums. The communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for a global evolution network.

Each of the user computing devices 110, pilot electronic devices, 120, or administer computing device 130 (collectively, electronic devices 110-130) may represent any computing device including a processing unit. The processing unit may execute any software application or a web browser application that accesses or receives data records provided by the analytics server 140a. The processing unit may include a processor with a computer-readable medium, such as a random access memory coupled to the processor. The electronic devices 110-130 may be running algorithms or computer-executable program instructions, which may be executed by a single processor or multiple processors in a distributed configuration. The electronic devices 110-130 may interact with one or more software modules of the same or a different type operating within the system 100.

Non-limiting examples of the processor may include a microprocessor, an application-specific integrated circuit, and a field programmable object array, among others. Non-limiting examples of the electronic devices 110-130 may include a server computer, a workstation computer, a tablet device, and a mobile device (e.g., smartphone,). An end-user (e.g., a passenger, a pilot, airline employee, flight crew, or anyone else associated with the pilot's next flight) may operate the electronic devices 110-130. For ease of explanation, FIG. 1 illustrates a single computing device functioning as the electronic devices 110-130. However, some embodiments may include a plurality of computing devices capable of performing the tasks described herein.

The messages transmitted received by the electronic devices 110-130 may be processed using, e.g., a natural language processing algorithm. Data may be extracted from the messages so that the smart notifications may be automatically created and modified.

Electronic devices 110-130 may be configured to output content in accordance with instructions received from the analytics server 140a. Therefore, the electronic devices 110-130 may be operated by anyone that is trying to reach the pilot and/or the airline. The electronic devices 110-130 may execute an application to access one or more GUIs provided by the analytics server 140a. An example of a GUI may be a website accessible through a browser application or a mobile application executing on the electronic devices 110-130.

For instance, the electronic devices 110-130 may execute a browser application and access a website hosted (or at least partially controlled by) the analytics server 140a. In another example, the analytics server 140a may host/generate an application accessible by the electronic devices 110-130. In some embodiments, a pilot may be able to log into the pilot's account, e.g., on any of the pilot electronic devices 120, and view any notifications that were sent to the pilot.

As used herein, user computing devices 110 may include any electronic device or system that is operated by a user who is trying to send a message to the pilot and/or airline. For example, user computing devices 110a and 110b may include any electronic device that is used by a passenger to receive input who wants to send a message to the pilot about a friend that the passenger wants to bring or about a large and heavy piece of cargo that the passenger wants to bring. As another example, the user computing devices 110a may be operated by a flight crew member (e.g., co-pilot) who wants to notify the pilot that the co-pilot is running late for the next flight.

In some embodiments, server 110c may include a server sends an automatic notification to the pilot by push notification but may receive a return message indicating failure of delivery because the pilot is currently in the restricted period. For example, the server 110c may include any device or system that is connected to one of the user computing devices 110a or 110b that is run by a third party separate from the airline for the pilot's next flight. For example, a passenger for the pilot's next flight may try to notify the pilot using the user computing devices 110a and/or 110b, and the server 110c may sends that notification to the pilot via push notification (e.g., text message, in-app message, etc.). However, the server's 110c message may be routed to the analytics server 140a for processing as described in more detail below.

As used herein, pilot electronic devices 120 may include any electronic device or system that is operated by the pilot who uses it to receive smart notifications and/or updates from the airline. The pilot electronic devices 120 may be push notification-enabled but the push notification feature may be disabled while the pilot is in a mandatory restricted period. For example, an area A may include some legislation or rule imposed by the government or other regulating authority (e.g., a pilots association, union, etc.) may require that a pilot who just ended a flight not be notified for a certain period of time by the airline (e.g., restricted period). This restricted period may increase or decrease depending on the legislation and rules that govern restricted periods. For example, in area A, there may be a rule that says the restricted period must be increased by an hour for every time zone that the pilot crossed. As another example, there may be a rule that states the restricted period must increase by an hour for every 30-minute period that the previous flight was delayed. As another example, there may be a rule that states the restricted period may be shortened by a certain amount if the trip was shortened (e.g., due to stronger winds). There may be another rule that says that the restricted period must be at least a certain amount if the pilot lifted off in the previous flight. In some embodiments, analytics server 140a may calculate the total restricted period based on all of the rules that apply.

In some embodiments, the pilot may be employed by multiple airlines. In this situation, the analytics server may incorporate flight data for the pilot from multiple airline servers so that the restricted period is accurately calculated.

While the analytics server 140a determines that the pilot electronic devices 120 that requested to receive a notification is in the restricted period, the pilot may not receive any notifications from the airline. During the determined restricted period, the pilot's push notifications for the computing device may be disabled. In some embodiments, the feature of an application (e.g., an application run by the airline) that pushes notifications to the pilot may be disabled so that the pilot does not receive any push notifications. However, the pilot may still be able to access the application and/or the notifications if the pilot wishes. For example, during the determined restricted period, the pilot may feel sufficiently rested to begin preparing for the next flight, and the pilot may voluntarily choose to look at the notifications prepared for the pilot.

In some embodiments, even if the pilot electronic devices 120 have their push notifications disabled, the application installed on the pilot electronic devices 120 may still receive various electronic messages from the user computing devices 110, administrator computing device 130, or analytics server 140a. For example, even during the determined restricted period, the pilot may log into the application on the pilot electronic device 120a to retrieve all of the messages that have been received, since the pilot is voluntarily checking the messages rather than receiving any push notification from the airline. In some embodiments, the application may include an updated notification that only shows the latest updates that has been provided by the analytics server 110a.

In some embodiments, the pilot or the airline may set different settings for the pilot to receive the notifications during the determined restricted period. For example, the pilot's email account may receive electronic notifications regarding any updates but the pilot electronic devices 120 may have push notifications for the emails disabled. As another example, the analytics server 140a may disable sending any text messages at all to the pilot electronic devices 120. As a further example, the pilot's account on the application may receive the electronic messages but push notifications to the pilot electronic devise 120 may have been disabled so that the electronic messages may only be viewed during the determined restricted period if the pilot voluntarily logs into the application, as discussed above. In still another example, the analytics server may not send an automated phone call to the pilot electronic device 120a.

As used herein, the administrator computing device 130 may include any electronic device or system that is operated by an airline employee who uses the electronic device or system to send notifications to the pilot. For example, the airline may wish to send a message to the pilot that the departure time for a pilot's next flight has changed or that the pilot's next flight's cargo load has changed.

The system 100 may operate in a cloud-computing environment where the user devices 110, pilot devices 120, and/or administrator computing device 130 may be cloud-optimized. The GUIs and elements generated by the analytics server 140a (e.g., services provided by the analytics server 140a) may be stored and executed on a remote cloud-based analytics server 140a accessed over a network cloud.

The analytics server 140a may be any computing device capable of performing the actions described herein. For instance, the analytics server 140a may include a processing unit and a non-transitory machine-readable storage medium. The processing unit may include a processor with a computer-readable medium, such as a random access memory coupled to the processor. The analytics server 140a may be executing algorithms or computer-executable program instructions, which may be executed by a single processor or multiple processors in a distributed configuration. The analytics server 140a may be configured to interact with one or more software modules of the same or a different type operating within the system 100.

Non-limiting examples of the processor may include a microprocessor, an application-specific integrated circuit, and a field programmable object array, among others. The analytics server 140a is capable of executing data processing tasks, data analysis tasks, and valuation tasks. Non-limiting examples of the analytics server 140a may include a desktop computer, a server computer, a laptop computer, a tablet computer, and the like. For ease of explanation, FIG. 1 depicts a single server computing device functioning as the analytics server 140a. However, some embodiments may include a plurality of server computing devices capable of performing various tasks described herein.

The analytics server 140a may utilize a database, such as the database 140b, to store and/or retrieve various data described herein. For instance, the analytics server 140a may store different data corresponding to different notifications within the database 140b. The database 140b may also include data associated with the user operating the user computing devices 110, pilot electronic devices 120, or the administrator computing device 130 (e.g., name, occupation, relationship to pilot, and other demographic data) and payment information (e.g., card numbers or other unique identifiers associated with customer's payment card and other payment information).

The database 140b may be a data repository configured to store data associated with user preferences, attributes associated with various graphical elements to be generated by the analytics server 140a, and the like. In another example, the database 140b may store other user data, such as user preferences, user profile, and various other customization attributes. In yet another example, the database 140b may store pilot-specific data or flight-specific data. For instance, various pilot information or rules/regulations regarding restricted periods discussed herein (e.g., restricted periods, a pilot's past, present, and future flight information, rules/regulations/legislation regarding restricted periods that are specific to the area that the pilot is in or general rules/regulations, etc.) can be stored within the database 140b. The database 140b may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 140b is shown as a separate computing feature, the database 140b may be a part of a computing environment that includes the analytics server 140a.

The analytics serve 140a may be connected to other devices and/or systems that provide data that may affect a pilot's current or next flight. For example, the analytics server 140a may be connected to one or more weather stations that provide weather data including whether or not there is a storm or blizzard coming that may affect the pilot's ability to land in the pilot's destination or delay the pilot's next flight. As another example, the analytics server 140a may be connected to the Federal Aviation Administration (or any similar regulating authority) that may provide information regarding the pilot's current or next flight such as all airplanes are to avoid a certain area or being grounded due to some local event. As a further example, the analytics server 140a may be connected to an airport's air traffic control center/tower that may provide data regarding the airport where the pilot is expected to land or take off. All this data from various sources may be received and processed to generate and/or modify smart notifications for the pilot.

The analytics server 140a may receive the data and provide a notification that is tailored and/or customized for the pilot. The analytics server 140a may receive the data from the various sources (e.g., the user computing devices 110, administrator computing device 130, weather station, FAA, etc.), analyze how the data will affect any existing messages for the pilot, generate and/or modify any queued messages for the pilot, and hold the message until the pilot is out of the restricted period. Once the pilot is out of the restricted period, the message may be sent to the pilot via a push notification via a text message and/or through an application on the pilot electronic devices 120. As a result, a single notification may include a single message that includes the latest information needed by the pilot.

For example, the analytics server 140a may receive a message (e.g., indication, message, phone call, etc.) from a passenger (who is scheduled to be flown by the pilot may) indicating that the passenger is going to be late two hours for the passenger's flight. The analytics server 140a may receive the message and create an object (e.g., a message) that includes the passenger's message that the passenger is going to be two hours late for the flight. The message may be queued to be delivered to the pilot via the pilot electronic devices 120 when the restricted period ends. Then the passenger may send another update to the analytics server 140a that indicates the passenger is going to be an additional three hours late. The analytics server 140a may take this information and check whether or not there is a queued message related to the passenger's late arrival. The analytics server 140a may find that there is a queued message that indicates the passenger is expected to be two hours late. The analytics server 140a may then calculate that the passenger is expected to be five hours late, rather than just two hours late. The queued message may be modified to indicate that the passenger is expected to be five hours late. Then once the pilot is out of the restricted period, the analytics server 140a may provide only one notification to the pilot device that includes a message that says the passenger is expected to be five hours late.

In some embodiments, the analytics server 140a may adjust any notifications for the pilot based on data input by the administrator computing device 130. For example, an employee of an airline may receive a phone call from the passenger who is expected to be in the pilot's next flight indicating that the passenger is going to be late by two hours. The employee may input data into the administrator computing device 130 to indicate the passenger's delay which may be transmitted to the analytics server 140a for processing.

For example, at a certain time during the determined restricted period, the analytics server 140a may receive data from the local weather station that it is expected to snow in an area that may affect the pilot's ability to fly out of an airport. And then later in the day but still during the determined restricted period, the analytics server 140a may receive an update from the local weather station saying that there is no longer any snow that is going to come at the airport. The analytics server 140a may receive the both pieces of data (e.g., that it will snow and then it will not snow) and ultimately not provide any notification to the pilot related to the snow report.

In some embodiments, the pilot may optionally view all of the updates during the restricted period, rather than have the analytics server 140a provide a summary after the restricted period is over. For instance, the pilot may log on (during the restricted period and/or after the restricted period) and request to view a flight history to see various changes of events.

In some embodiments, the analytics server 140a may continue to update the queued messages even after the restricted period has ended. This may be useful, for example, when the pilot checks the notifications after the restricted period has ended. For example, the smart notifications may be pushed at the time the restricted period ends. However, the pilot may not check the application on the pilot electronic devices 120 immediately/soon after the restricted period ends, and there may be additional updates to the flight plan after the restricted period has ended. The application may send a notification to the analytics server 140a that the pilot did not check the queued messages even after the restricted period has ended. Then the analytics server 140a may continue to update the messages being transmitted through the application so that when the pilot checks the pilot electronic device 120 for any updates, the updated notification can be displayed. In some embodiments, the pilot electronic devices 120 may receive push notifications for every update once the pilot is out of the restricted period.

The analytics server 140a may categorize the different types of notifications for processing. For example, any updates related to the weather may be categorized under a weather category. As another example, any updates related to the weight of the plane may be categorized under a weight category (e.g., addition or removal of passengers, heavy objects that the passenger wishes to bring, etc.). As a further example, any updates related to departure time may be categorized under a flight time category. In some embodiments, an update to one category may affect the updates to a different category. For example, if a passenger sends a message saying that he wishes to bring his friends after a party, the weight category may receive an update regarding the additional friends and the flight time category may receive an update regarding the delay in departure time.

The analytics server 140a may also calculate the restricted period of the pilot. For example, the analytics server 140a may receive the pilot's previous flight information (e.g., arrival time, flight period, departure city, etc.). The analytics server 140a may also retrieve from the database 140b or another source any local/state/federal/international rules and regulations regarding how long the restricted periods should be calculated for the pilot. The analytics server 140a may accumulate all of this data, process the data, and calculate how long the restricted period is supposed to be. Depending on the situation, the restricted period may be updated based on any updates that the analytics server 140a may receive. In calculating the restricted period, the analytics server 140a may take into consideration the flight duration, flight starting time, flight landing time, flight path, flight distance, a type of flight, a type of plane, a number of time zones with the previous flight, and any other factor that may be used or required by the rules.

The analytics server 140a may use a dynamic set of rules to calculate the restricted period, some of which may change in accordance with a variety of factors. When calculating the restricted period, the analytics server 140a may query and retrieve a latest set of rules that apply to the pilot and/or the flight. The latest set of rules may indicate how to calculate the restricted period in accordance with the pilot's attributes (age, previous flight information, location, and the like) and flight attributes (e.g., flight duration, flight distance, time zones traveled, and/or flight time). Due to a high number of permutations and different possibilities, the restricted period may vary widely. For instance, a restricted period for a pilot on a particular day may be different than another pilot after a similar flight on the same day or the even the same pilot after they have completed the same type of flight on another day.

Once the pilot is out of the restricted period, the analytics server 140a may provide and/or push a notification to the pilot electronic devices 120 including the customized message. Depending on the pilot's preferences, the notification may be received via text message or through the application used by the airline.

FIG. 2 illustrates a flowchart depicting operational steps for creating and modifying smart notifications, in accordance with some embodiments. The method 200 describes how a server, such as the analytics server 140a described in FIG. 1, processes various inputs and provides an updated message to the pilot. Even though the method 200 is described as being executed by the analytics server 140a, the method 200 can be executed by any server and/or locally within a user's computing device or as a browser extension.

At step 202, the analytics server (e.g., analytics server 140a) may receive a first request to transmit a first electronic message to a pilot account associated with an electronic device (e.g., pilot electronic devices 120). The first electronic message may be associated with a first flight event. In this disclosure, flight events may include any changes to the departure time, any update to the list of passengers (and their related information such as age, weight, picture, etc.), any update to the list of cargo, any changes in weather forecasts, and any piece of information that may be helpful for the pilot to know.

For example, a passenger that is scheduled to be flown by the pilot may send the first electronic message indicating that the passenger's meeting is scheduled to run late such that the passenger wishes to delay the departure time by two hours. The passenger may transmit the message to an administrator (e.g., an employee of the airline). The passenger may use any of the user computing devices (e.g., user computing devices 110 of FIG. 1) to try to send that message. For instance, the passenger may access a website or an application associated with the airline and transmit an electronic message indicating that the passenger would like to delay the flight. The first electronic message may be routed to the analytics server so that it may be processed, rather than being sent directly to the pilot's electronic device. Therefore, the analytics server uses the methods and systems discussed herein to regulate how and when the pilot is notified (rather than the messages from passenger or airline employees being directly transmitted to the pilot). Therefore, when a passenger requests a change, the analytics server only notifies the pilot when/if the requested change affects the pilot and/or the flight.

In some embodiments, the first electronic message may be transmitted from an administrator computing device (e.g., administrator computing device 130 of FIG. 1). For example, a user (e.g., airline employee or employer of the pilot) of the administrator computing device 130 may receive a message outside the system 100 (e.g., phone call) that the passenger wants to delay the flight by two hours. The user may input the first electronic message to the administrator computing device 130 which may then be routed to the analytics server 140a for further processing.

In some embodiments, the analytics server may transmit the first electronic device to the pilot's electronic device if the first electronic message is urgent and/or important enough. For example, the analytics server may receive an input (e.g., urgency value) with the first electronic message that indicates how urgent the message is. And if the urgency is above a certain threshold, the analytics server may transmit the first electronic device to the pilot's device immediately even during the determined restricted period.

When/if the analytics server forces notification to the pilot under specific and urgent circumstances, the analytics server may then iteratively recalculate the restricted period for the pilot. Transmitting a notification during the restricted period may impact the length and timing for future restricted periods. Because the logic for calculating and managing the restricted periods (e.g., computer model that calculates the restricted period for a pilot) is implemented by the analytics server (e.g., the computer model resides on the computer system of the carrier and not the pilot's individual devices), the intentional interruption can be tracked and factored into future calculations of restricted periods. For instance, if there is an intentional break of the restricted period, the analytics server may consolidate outstanding new information into a smart notification, and knowing the severity of the different messages, highlight the most important information.

At step 204, in response to identifying that the first time is within a restricted period configured for the pilot account, the analytics server may queue the first electronic message without notification to the electronic device. The first electronic message may be queued in a database connected to the analytics server (e.g., database 140b of FIG. 1). The pilot account may be an account associated with the pilot for use within the application that is being run for the system 100. For example, the airline that manages the flights and employs the pilot may have a communication application that is used by pilots, passengers, and any other relevant personnel to transmit and receive electronic messages. In some embodiments, the application may utilize a typical text messaging system (e.g., short message service (SMS), or any other suitable form of the electronic messaging system).

The analytics server may calculate the restricted period for the pilot. As discussed herein, the analytics server may consider all of the rules and regulations that govern a pilot's restricted period. The rules/regulations may include specific details on how the pilot's restricted period ought to be calculated. For example, if the pilot has flown more than ten hours, the rules may dictate that the restricted period must be at least 24 hours. As another example, if the pilot crossed a time zone, the restricted period may be increased by an hour for every time zone that the pilot crossed.

Once the restricted period is calculated, the analytics server may determine whether the first electronic message was received during the determined restricted period. If the analytics server determines that the first electronic message was received during the determined restricted period, the analytics server may create a queue for the first electronic message. In some embodiments, the analytics server may create a data object for smart notifications that can be created, edited, and deleted depending on the messages that come in during the determined restricted period. When the first electronic message is queued, a notification may not be sent to the pilot's electronic device. If the analytics server determines that the first electronic message was received outside of the restricted period, the analytics server may immediately transmit the first electronic message to the pilot's electronic device via push notification. In some embodiments, the restricted period is calculated for the pilot when the notification is to be sent. In some embodiments, the analytics server calculates the restricted period and saves the value in the database, and the analytics server accesses a data record in the database that includes the calculated restricted period.

At step 206, the analytics server may receive at a second time a second request to transmit a second electronic message to the electronic device. The second electronic message may be associated with a second flight event. The second time may be any time after the first time from step 202. For example, the analytics server may receive the first electronic message five hours into the restricted period of 16 hours, and the analytics serve may receive the second electronic message six hours into the restricted period.

The second flight event may be related to the first flight event. In the above example, the first flight event may include a message that the flight departure time was delayed by two hours. The first electronic message may be queued in the analytics server's database. The passenger may send another message (to the analytics server) during the determined restricted period indicating that the passenger is going to be additionally delayed by one hour. The second flight event in this example may be a flight delay of another one hour. As another example, the first flight event may include a weather forecast that indicates a blizzard is coming around the time of the pilot's next flight departure time. The second flight event may include an update to the weather forecast that the blizzard is no longer expected to occur around the departure time.

In some embodiments, the second flight event may not be related to the first flight event. For example, the first flight event may indicate a delay of two hours because the passenger was running late, and the second flight event may indicate a delay of an additional three hours because of the weather.

At step 208, in response to identifying that the second time is within the restricted period, the analytics server may queue the second electronic message without notification to the electronic device. The second electronic message may also be queued in the database connected to the analytics server.

At step 210, in response to identifying an end of the restricted period, the analytics server may transmit, at a third time after the end of the restricted period, a third electronic message to the pilot account associated with the electronic device. As opposed to the first and second electronic messages that are not transmitted to the pilot device, the analytics server may transmit the third message to the pilot device or may otherwise notify the pilot of the third message's existence (e.g., transmit a notification to the pilot device that a flight event need their attention). The third electronic message may include an updated flight event in accordance with the first flight event and the second flight event. As discussed herein, the third electronic message may be transmitted to the pilot via a push notification to the pilot's electronic device. In some embodiments, the pilot may have the option to view all of the messages he received during the determined restricted period (e.g., first and second electronic messages).

In some embodiments, the analytics server may combine the first and second electronic messages such that the third electronic message only includes a final update of what the pilot should know. For example, if the first electronic message includes a message from the passenger that the passenger will be two hours late (associated with the first flight event of two hours of delay in departure time), and if the second electronic message includes a message from the passenger that the passenger will be an addition three hours late (associated with the second flight event of additional three hours of delay departure time), the third electronic message may include an updated flight event that indicates a total of five hours of delay time. In some embodiments, the first flight event may include a two-hour delay, and the second electronic message may include a message that the passenger is actually expected to be an hour earlier than expected. In this situation, the third electronic message may include a message that the flight departure time has been delayed by one hour than the originally scheduled departure time.

In some embodiments, the analytics server may combine any subsequent electronic message at the time of receiving the subsequent electronic message. For example, after the first electronic message has been received, the analytics server may receive a second electronic message. The first and second electronic messages may be combined, at the time the second electronic message is received, into a third electronic message that includes the latest/updated flight event, rather than waiting until the end of the restricted period. Then if and when another electronic message is received after the second electronic message, the analytics server may create a fourth electronic message that includes any updates from the third electronic message and the another electronic message.

In some embodiments, the first and second electronic messages may be transmitted as soon as they are received by the analytics server without generating a push notification in the pilot's electronic device. For example, the pilot's electronic device may include an application that can receive the electronic messages from the analytics server and/or the user computing devices and/or the administrator computing device. However, during the determined restricted period, the application may not generate a notification for the pilot such that the pilot has an electronic message waiting for him. Instead, the application may perform the steps of combining the electronic messages and generating an updated message that may provide the updated flight event.

Although not described in detail, one of ordinary skill will recognize that various steps of the method 200 may be repeated. For example, more than two messages may be received (by the analytics server) from the passenger and/or messages related to the departure time may be received from multiple sources. The analytics server may then apply the method 200 to determine how and when to notify the pilot without violating the pilot's restricted period requirements.

In some embodiments, the pilot may choose to look at any updates during the determined restricted period by logging into the pilot's account on the application on the pilot's electronic device. In those embodiments, the pilot may voluntarily request to view one or more updates (e.g., flight events) even though the analytics server has not notified the pilot regarding those events. For instance, even though no notification has been transmitted to the pilot's device, the pilot may voluntarily log into the pilot's account and requests to view updates/flight events.

The analytics server may receive an alert that the pilot received the latest update (e.g., third electronic message which includes the combined message of the first and second electronic messages). Then the analytics server may continue to operate according to method 200 by receiving additional electronic messages and updating the flight events from the point when the pilot saw the notifications. For example, if the pilot already saw that the flight departure time has been delayed three hours, the pilot does not need another notification saying that the flight departure time has been delayed three hours when the pilot comes out of the restricted period. Instead, the pilot may receive a notification that there were no additional updates since the plot last checked in the application, or it may receive a summary of the last update (e.g., departure time is now 10 AM instead of 7 AM).

In some embodiments, steps of the method 200 may be repeated for any additional electronic messages that the analytics server receives after the pilot has checked the flight events in the application during the restricted period (even though no notifications regarding those flight events was transmitted to the pilot's device to alert the pilot regarding those flight events). For example, after an updated message and flight event information has been checked by the pilot, the system may enter step 206 again and receive any additional electronic messages so that the analytics server may update the existing electronic messages that were already checked by the pilot.

In some embodiments, the pilot may have a setting in the pilot's electronic device or pilot's account in an application to receive all notifications immediately. However, if the analytics server detects that the pilot is still within the restricted period, the analytics server may prevent the pilot's electronic device from receiving any notifications via text message and/or within the application. For example, if the passenger tries to send an electronic message to the pilot, the analytics server may prevent the electronic message from being sent to the pilot's electronic device or into the pilot's account in the application. In some embodiments, the analytics server may automatically turn off the push notification setting in the pilot's electronic device. Accordingly, even if the pilot has multiple pilot electronic devices (e.g., smart phone, tablet, laptop, smart watch, etc.) during the restricted period, the push notifications may be prevented from being received by all of the pilot electronic devices.

Accordingly, the method 200 and other embodiments described herein may provide advantages of providing a summarized (or customized or distilled or updated) message to a pilot who is scheduled to fly a plane operated by an airline.

In some configurations, the pilot may be informed of an updated notification during the restricted period. As a result, the analytics server may revise a data record to indicate that the pilot has been updated and a corresponding timestamp associated with the pilot receiving the information. The analytics server may use the timestamp to determine any subsequent updates (and how to subsequently update the pilot). In a non-limiting example, the pilot may log into an application provided by the analytics server and review updates or call an administrator to receive any updates. If the pilot views the update or if the pilot receives the update during the call, the analytics server may then determine a timestamp of the pilot's receipt of the update/notification. The analytics server may then revise the subsequent notifications accordingly. For instance, if a pilot calls an administrator and request updated information associated with a flight, the administrator may verbally inform the pilot of the requested updates and may indicate that the pilot has received the updates. The analytics server may update its records accordingly. Thereby, the analytics server may not include the updates already received by the pilot if any subsequent notifications/updates occur. The analytics server may use the methods and systems described herein to regulate how/when the pilot (or the flight crew) receives notifications associated with their flight. Moreover, the methods and systems described herein can also apply to other parties involved, such as the aircraft owner, passengers, and/or other concerned parties (e.g., other parties awaiting the passengers, the pilot, and/or the flight crew). Therefore, any of the notifications discussed herein can also be sent to the passengers and/or concerned parties as well as the pilot and the flight crew. For instance, a passenger or a pilot's significant other may receive a notification that a flight has been delayed where the notification also includes the new arrival time.

Additionally or alternatively, the notifications can be based on the notification recipient's location. For instance, when a passenger (e.g., owner of the aircraft) is within a predetermined proximity of their departure (e.g., 10 miles away from the airport or a fix-base operator or a predetermined time away from the flight and/or the airport), the analytics server may notify the passenger regarding the latest flight updates and events. The analytics server may also transmit an estimated time of arrival of the passenger to the pilot and/or the flight crew.

In another example, when the owner of the aircraft (or a pilot and/or the flight crew) is within a predetermined proximity to their arrival airport or fixed-base operator, the analytics server may transmit an estimated time of arrival to the designated concerned parties (e.g., parties awaiting the arrival, such as the pilot's wife or an owner's husband).

In another example, based on the estimated time of arrival (or departure), the analytics server may send notification(s) to one or more parties discussed herein (e.g., aircraft owners, passengers, pilot, flight crew, and their concerned parties). In a non-limiting example, based on the flight's scheduled departure time and the current location of the owner/passenger, the analytics server may estimate a commute time to the airport. If the commute time, which can also account for traffic and other road conditions, conflicts with the scheduled departure time, the analytics server may transmit a reminder to the owner/passenger urging them to leave soon. Subsequently, the analytics server may monitor the location of the owner/passenger to determine if their estimated time of arrival is greater than 15 minutes of the scheduled departure time. If so, the analytics server may notify the pilot and/or the flight crew and revise the estimated arrival time for the flight as needed. Optionally, the analytics server may notify the concerned parties regarding a possible delay of the flight.

Figure 3:
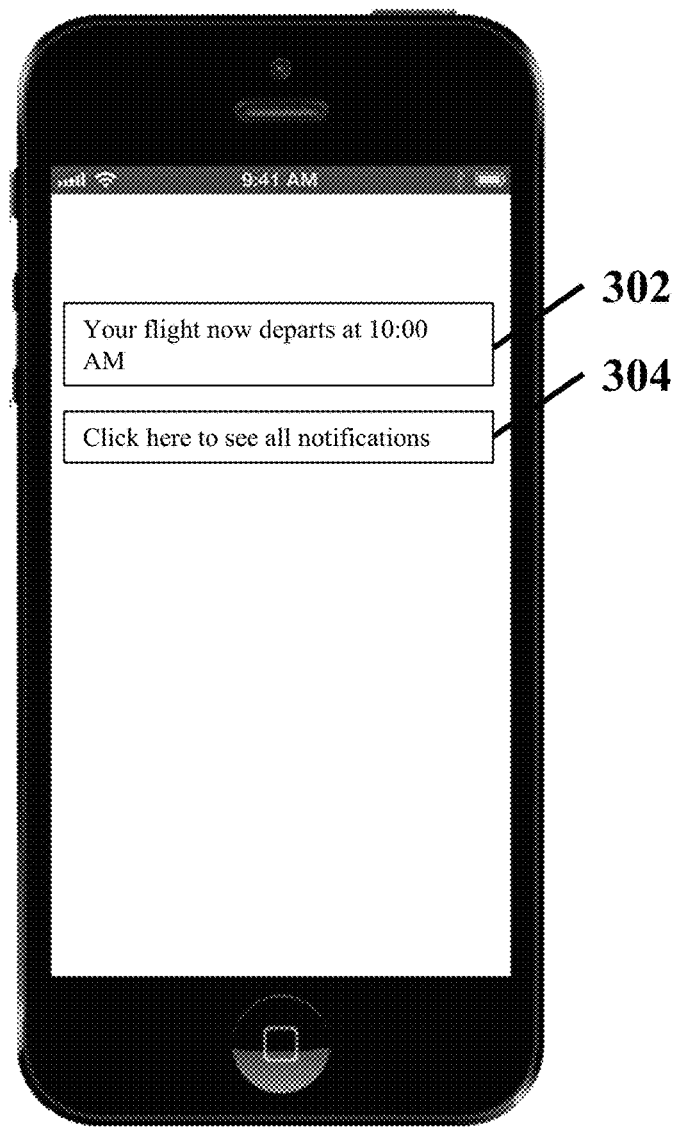
FIG. 3 illustrates an example pilot electronic device, which includes the smart notifications, in accordance with some embodiments.

FIG. 3 illustrates an example pilot electronic device 300 which includes the smart notifications, in accordance with some embodiments. The pilot electronic device 300 may include a pilot electronic device 120. The pilot electronic device 300 includes a smart notification 302 and an interactive button 304.

The smart notification 302 may include the latest update that has taken into account all of the received messages and updates regarding the departure time. The smart notification 302 may be generated and pushed to the pilot electronic device 300 (via text message, application, browser, etc.) after the restricted period.

The interactive button 304 may include an option for the pilot to look at all of the notifications 304 that have been received that culminated in the smart notification 302. For example, when the pilot presses the interactive button 304, the pilot electronic device's 300 display may display all of the messages and updates that were received during the restricted period.

In an example, once a pilot completes a flight, an analytics server may calculate the restricted period for the pilot using rules and regulations. The analytics server may save this calculated restricted period in a database. During the calculated restricted period, a passenger for a flight for which the pilot is scheduled to fly may log into an application and indicate that the passenger desires to delay the flight by 30 minutes in a first electronic message. An hour later, the same passenger may log into the application and again and indicate that the she is bringing two additional passengers in a second electronic message. Two hours later, the maintenance crew who is working on the plane that the pilot is supposed to fly with the passenger may log into the application and indicate that the flight needs to be delayed one hour in order to ensure that the plane has no mechanical issues in a third electronic message.

The analytics server may receive each of the first, second, and third electronic messages and queue them for transmission to the pilot once the pilot is out of the calculated restricted period. When the pilot comes out of the calculated restricted period or is about to come out of the calculated restricted period, the analytics server may analyze the queued electronic messages to determine if the electronic messages may be combined into a single electronic notification (e.g., an updated electronic message that can be pushed to the pilot's device). The analytics server may determine that the total delay of the pilot's next flight is one hour and 30 minutes later than the originally scheduled time. The analytics server may push the updated electronic message to the pilot's account within the application so that the pilot can receive updated single electronic notification that includes the latest information needed by the pilot (e.g., notify the pilot that the flight is departing with the one and a half hour delay). The analytics server may also push the notification that the passenger number has increased to a total of three people in the same updated electronic notification or provide a separate electronic notification. Accordingly, the pilot may only see the updated departure time and passenger list at the same time, rather than all of the three messages separately.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate the transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc", as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a processor at a first time, a first request to transmit a first electronic message to a pilot account associated with a user device, the first electronic message associated with a first flight event;
   in response to identifying that the first time is within a restricted non-flying period in which an employer of a pilot is restricted from contacting the pilot, wherein the pilot is associated with the pilot account, queuing the first electronic message without notification to the user device;

receiving, by the processor, at a second time, a second request to transmit a second electronic message to the user device, the second electronic message associated with a second flight event;

in response to identifying that the second time is within the restricted non-flying period, queuing the second electronic message without notification to the user device; and in response to identifying an end of the restricted non-flying period, transmitting, by the processor at a third time after the end of the restricted non-flying period, a third electronic message to the pilot account associated with the user device to be outputted, the third electronic message comprising an updated flight event in accordance with the first flight event and the second flight event.

2. The method of claim 1, further comprising:
transmitting, by the processor to the user device, the first electronic message or the second electronic message at the first time or the second time without causing the user device to output a notification associated with the first electronic message or the second electronic message.

3. The method of claim 2, wherein the processor transmits the first electronic message or the second electronic message in response to receiving an indication that the user device is executing an application configured to output the first electronic message or the second electronic message.

4. The method of claim 1, further comprising:
calculating, by the processor, the restricted non-flying period in accordance with flight duration, flight starting time, flight landing time, flight path, flight distance, a type of flight, a type of plane, and a number of time-zones associated with a flight associated with the pilot account.

5. The method of claim 1, wherein the updated flight event corresponds to a change associated with a time of flight, a number of passengers, a destination, or cargo.

6. The method of claim 1, further comprising:
transmitting, by the processor, the first electronic message or the second electronic message at the first time or the second time when an urgency value of the first electronic message or the second electronic message satisfies a threshold.

7. The method of claim 1, further comprising:
preventing, by the processor, a notification associated with the first electronic message or the second electronic message to be outputted by the user device during the restricted non-flying period.

8. The method of claim 1, further comprising:
preventing, by the processor, a notification associated with the first electronic message or the second electronic message to be outputted by a second user device associated with the pilot account.

9. A computer system comprising:
a server comprising a processor and a non-transitory computer-readable medium containing instructions that when executed by the processor causes the processor to perform operations comprising:
receiving, at a first time, a first request to transmit a first electronic message to a pilot account associated with a user device, the first electronic message associated with a first flight event;

in response to identifying that the first time is within a restricted non-flying period in which an employer of a pilot is restricted from contacting the pilot, wherein the pilot is associated with the pilot account, queuing the first electronic message without notification to the user device;

receiving, at a second time, a second request to transmit a second electronic message to the user device, the second electronic message associated with a second flight event;

in response to identifying that the second time is within the restricted non-flying period, queuing the second electronic message without notification to the user device; and in response to identifying an end of the restricted non-flying period, transmitting, at a third time after the end of the restricted non-flying period, a third electronic message to the pilot account associated with the user device to be outputted, the third electronic message comprising an updated flight event in accordance with the first flight event and the second flight event.

10. The computer system of claim 9, wherein the instructions further cause the processor to perform operations comprising:
transmitting to the user device the first electronic message or the second electronic message at the first time or the second time without causing the user device to output a notification associated with the first electronic message or the second electronic message.

11. The computer system of claim 10, wherein the instructions further cause the processor to perform operations comprising:
transmitting the first electronic message or the second electronic message in response to receiving an indication that the user device is executing an application configured to output the first electronic message or the second electronic message.

12. The computer system of claim 9, wherein the instructions further cause the processor to perform operations comprising:
calculating the restricted non-flying period in accordance with flight duration, flight starting time, flight landing time, flight path, flight distance, a type of flight, a type of plane, and a number of time-zones associated with a flight associated with the pilot account.

13. The computer system of claim 9, wherein the updated flight event corresponds to a change associated with a time of flight, a number of passengers, a destination, or cargo.

14. The computer system of claim 9, wherein the instructions further cause the processor to perform operations comprising:
transmitting the first electronic message or the second electronic message at the first time or the second time when an urgency value of the first electronic message or the second electronic message satisfies a threshold.

15. The computer system of claim 9, wherein the instructions further cause the processor to perform operations comprising:
preventing a notification associated with the first electronic message or the second electronic message to be outputted by the user device during the restricted non-flying period.

16. The computer system of claim 9, wherein the instructions further cause the processor to perform operations comprising:

preventing a notification associated with the first electronic message or the second electronic message to be outputted by a second user device associated with the pilot account.

17. A computer system comprising:

a user device configured to present one or more pages, and a server in communication with the user device, the server configured to:

receiving, at a first time, a first request to transmit a first electronic message to a pilot account associated with the user device, the first electronic message associated with a first flight event;

in response to identifying that the first time is within a restricted non-flying period in which an employer of a pilot is restricted from contacting the pilot, wherein the pilot is associated with the pilot account, queuing the first electronic message without notification to the user device;

receiving, at a second time, a second request to transmit a second electronic message to the user device, the second electronic message associated with a second flight event;

in response to identifying that the second time is within the restricted non-flying period, queuing the second electronic message without notification to the user device; and in response to identifying an end of the restricted non-flying period, transmitting, at a third time after the end of the restricted non-flying period, a third electronic message to the pilot account associated with the user device to be outputted, the third electronic message comprising an updated flight event in accordance with the first flight event and the second flight event.

18. The computer system of claim 17, wherein the server is further configured to transmit to the user device the first electronic message or the second electronic message at the first time or the second time without causing the user device to output a notification associated with the first electronic message or the second electronic message.

19. The computer system of claim 18, wherein the server is further configured to transmit the first electronic message or the second electronic message in response to receiving an indication that the user device is executing an application configured to output the first electronic message or the second electronic message.

20. The computer system of claim 17, wherein the server is further configured to calculate the restricted non-flying period in accordance with flight duration, flight starting time, flight landing time, flight path, flight distance, a type of flight, a type of plane, and a number of time-zones associated with a flight associated with the pilot account.

* * * * *